United States Patent
Sognefest et al.

[11] 3,742,447
[45] June 26, 1973

[54] DIGITAL INDICATING AND CONTROL APPARATUS AND METHOD

[75] Inventors: Peter W. Sognefest, Glenshaw; Bay E. Estes, III, Murrysville, both of Pa.

[73] Assignee: Essex International Inc., Fort Wayne, Ind.

[22] Filed: Aug. 17, 1970

[21] Appl. No.: 64,283

[52] U.S. Cl.............. 340/52 F, 307/10 LS, 315/77, 340/147 SY
[51] Int. Cl............................................. B60q 1/00
[58] Field of Search.................. 340/52 F, 52 R, 85, 340/163 X, 163, 147 SY, 147, 147 R, 147 RX, 251, 346; 307/10 LS, 10 R, 38, 40, 42, 155; 315/77, 312, 130, 152

[56] References Cited
UNITED STATES PATENTS

| 3,648,057 | 3/1972 | Sognefest et al.................. 307/10 R |
| 3,651,454 | 3/1972 | Venema et al..................... 340/52 F |
| 3,544,803 | 12/1970 | Taylor.............................. 307/10 R |
| 3,564,280 | 2/1971 | Sognefest et al.................. 340/163 |
| 3,541,504 | 11/1970 | Bush.................................. 340/251 |

*Primary Examiner*—John W. Caldwell
*Assistant Examiner*—Glen R. Swann, III
*Attorney*—Molinare, Allegretti, Newitt & Witcoff

[57] ABSTRACT

The disclosure describes an improved apparatus and methods for electrically activating a desired load device and for determining whether the desired load device is operating properly. The preferred embodiment described in the specification comprises a sensor, such as a photoelectric cell, for generating an indicating signal if the desired load device, such as an automobile headlight, is operating properly. The sensor is connected to a send-receive module that applies a coded control signal to a signal transmitting path in response to the indicating signal. The signal transmitting path is connected to a receive module that receives the coded control signal and activates a control device, such as a display lamp, which indicates whether the automobile headlight is operating properly. The send-receive module receives another coded control signal over the signal transmitting path that operates the load device. Both the send-receive module and the receive module preferably comprise binary counters that respond to the coded control signals.

3 Claims, 6 Drawing Figures

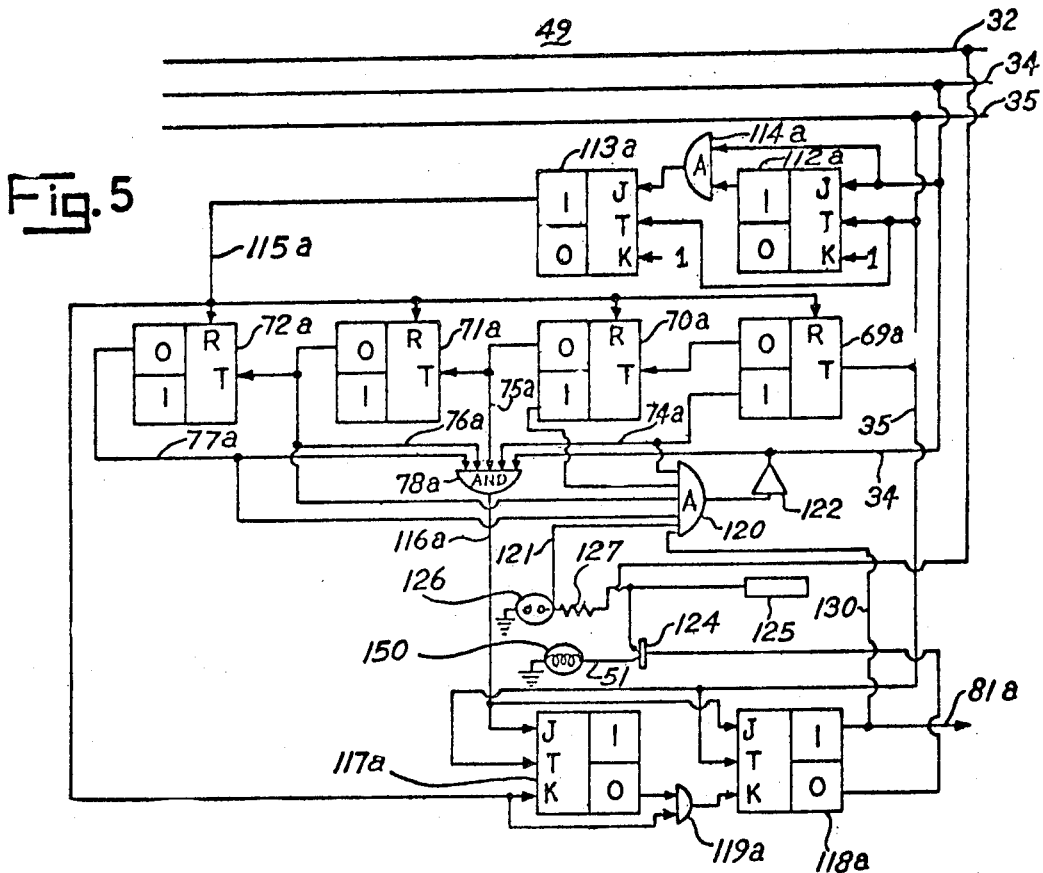
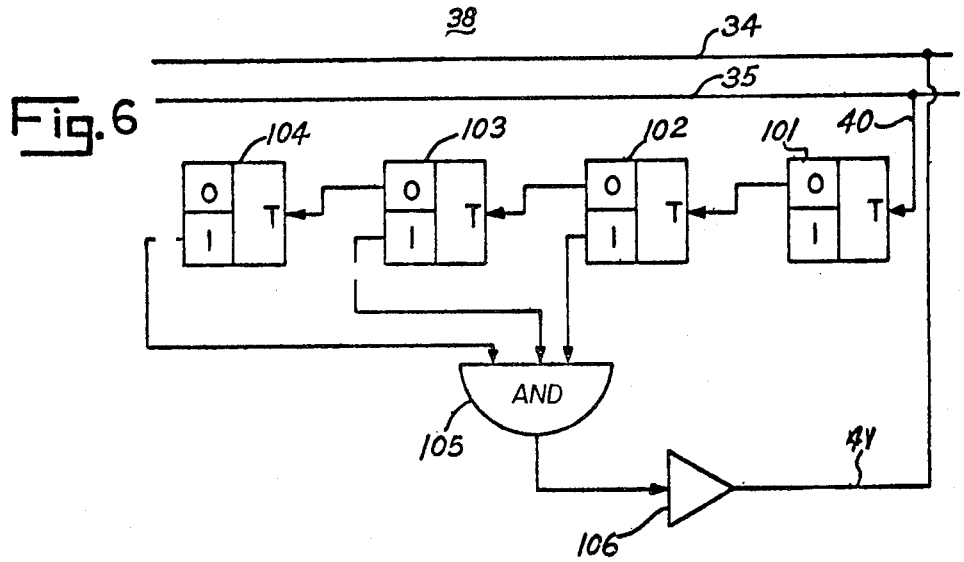

DIGITAL INDICATING AND CONTROL APPARATUS AND METHOD

BACKGROUND OF THE INVENTION

This invention relates to indicating and control apparatus, and is more particularly directed to such apparatus in which load devices are connected to a common harness and are controlled by coded signals.

One such system is described in U.S. Pat. application Ser. No. 799,406, entitled "Plex-path Circumferential Energy Control and Distribution System", filed Feb. 14, 1969 in the names of the present applicants and Ralph G. Nedbal of Pittsburgh, Pa.

Application Ser. No. 799,406 describes an electrical-fluidic control system adapted to control essentially every function of a vehicle. The specification in the application describes a single harness formed of electrical and fluidic transmission paths respectively connected to sources of electrical and fluid power. Control means are used to apply coded control signals to an electrical signal transmission path, and receiving means are connected to the electrical signal and power transmission paths for receiving the control signals to selectively activate electrical and fluidic switching means. The switching means, in turn, operate desired load devices for performing selected vehicle functions.

Although the system described in the foregoing application is a marked improvement over the electrical wiring systems presently employed in modern vehicles, it nonetheless has certain deficiencies that limit its overall potential usefulness. One of the limitations relates to the inability of the described system to indicate to a driver whether selected vehicle functions are operating properly. For example, the described system is unable to indicate whether the headlights of an associated vehicle produce a proper amount of light. In addition, the system is not capable of efficiently generating and receiving control signals from a single circuit that can be connected to any point along the harness.

SUMMARY OF THE INVENTION

The present invention, therefore, has as one of its principal objects the provision of improved apparatus and methods for controlling various vehicle functions and for determining whether the controlled vehicle functions are properly operating.

Another object is to provide apparatus that both receives and generates control signals from a single circuit that can be connected to the harness at any location.

In a preferred embodiment, the invention is preferably used in connection with a harness which may be positioned around a vehicle and to which various control modules may be connected for controlling every function of the vehicle, such as lighting, comfort, transmission, ignition, and the like. The harness preferably comprises a signal transmission path and an electrical power path that is connected to a source of electrical power. The system also comprises a sender means for applying a first control signal to the signal transmission path.

When used in the above-described type of system, a preferred embodiment of the present invention basically comprises a sensor, such as a photoelectric cell, for generating an indicating signal if a desired load device is in a predetermined operating condition. A send-receive module is connected to the electrical power and signal transmission paths for receiving the first control signal to selectively activate the desired load device and for applying a second control signal to the signal transmission path in response to the indicating signal from the sensor. A receive module is also connected to the electrical power and signal transmission paths for receiving the second control signal and activating a control device in response thereto.

The present invention offers a number of advantages. For example, by using a send-receive module of the type described herein, much of the same circuitry may be used in order to control the desired load device and to indicate the operating condition of the load device. This feature results in reduced cost of manufacture and repair, as well as reduced frequency of repair. As a result, almost every function of the vehicle may be simultaneously activated and tested to determine whether it is operating properly. MOreover, the operating condition of each desired function may be simultaneously indicated to the operator of the vehicle with a degree of convenience and reliability heretofore unattained.

DESCRIPTION OF THE DRAWINGS

These and other objects, advantages, and features of the present invention will hereinafter appear for purposes of illustration, but not of limitation, in connection with the accompanying drawings in which like numbers refer to like parts throughout, and in which:

FIG. 5 is a schematic circuit diagram of a typical send-receive module shown in connection with a sensor made in accordance with the present invention; and FIG. 6 is a schematic circuit diagram of a typical reset signal generator used in connection with the present invention.

DESCRIPTION OF THE PREFERRED EMBODIMENT

Figure 1:
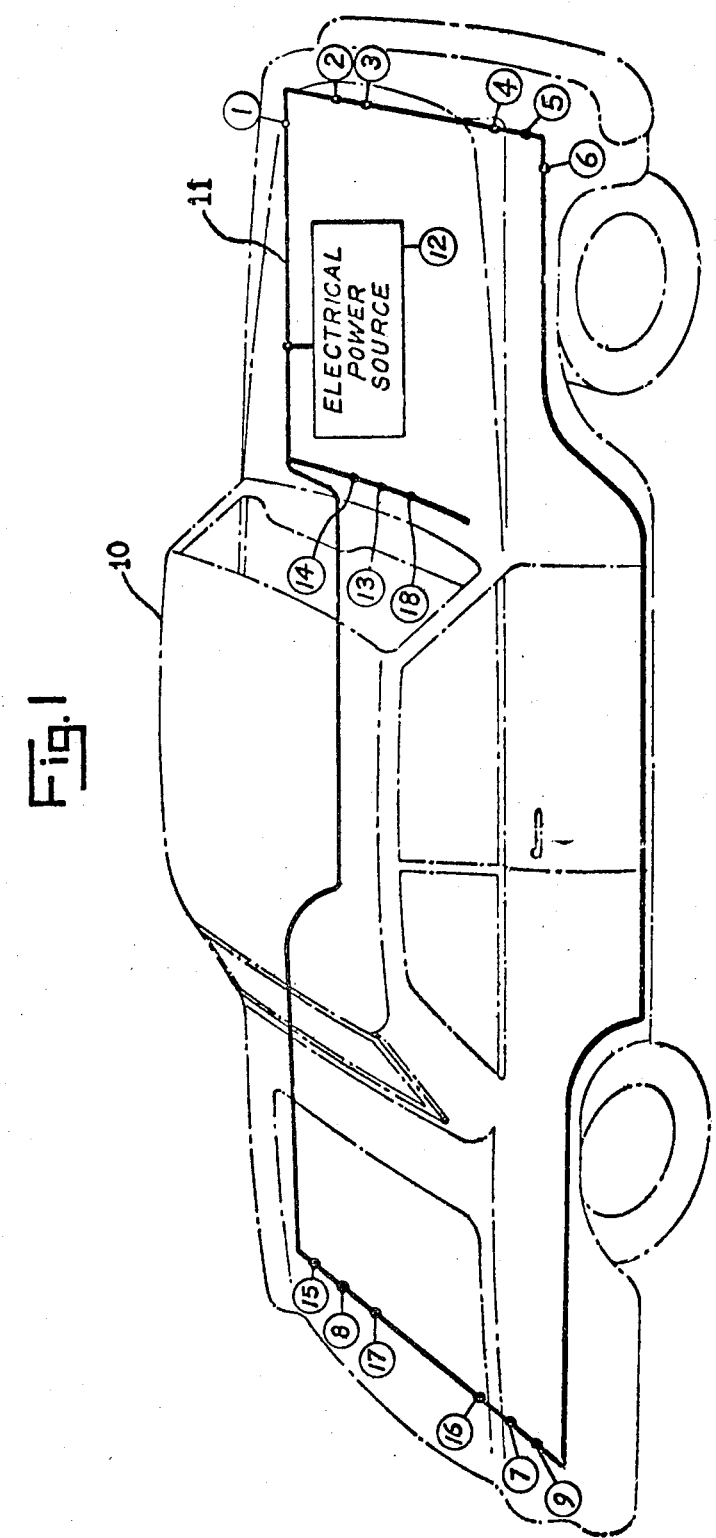
FIG. 1 is a schematic, partially fragmentary, perspective view of a preferred form of the present invention used in connection with an automobile vehicle chassis.

Referring now to the drawings, and more particularly to FIG. 1, there is illustrated an automotive vehicle embodying an exemplary form of the inventive indicating and control system. Th vehicle 10 has a harness 11 positioned about its periphery or circumference such that various power, control and receive modules may be connected thereto at any desired location on the automobile.

Thus, the power module 12 incorporating the source of electrical power can be located beneath the hood of the vehicle for connection to the harness 11. Advantageously, in one embodiment of the invention, the electrical power source may comprise a 12-volt battery.

Other modules which may be connected to the harness 11, as illustrated in FIG. 1, include two headlight modules 2 and 5, and two parking and turn signal lights 3 and 4, all located in their normal positions at the front of the vehicle. The harness also is shown as connected to the side light modules 1 and 6. At the rear of the automobile are the brake light modules 7 and 8, the taillight modules 9 and 15, and turn signal modules 16 and 17. Two exemplary send modules, 13 and 14, are located near the driver with an exemplary receive module 18 for display of lamp outage information.

Figure 2:
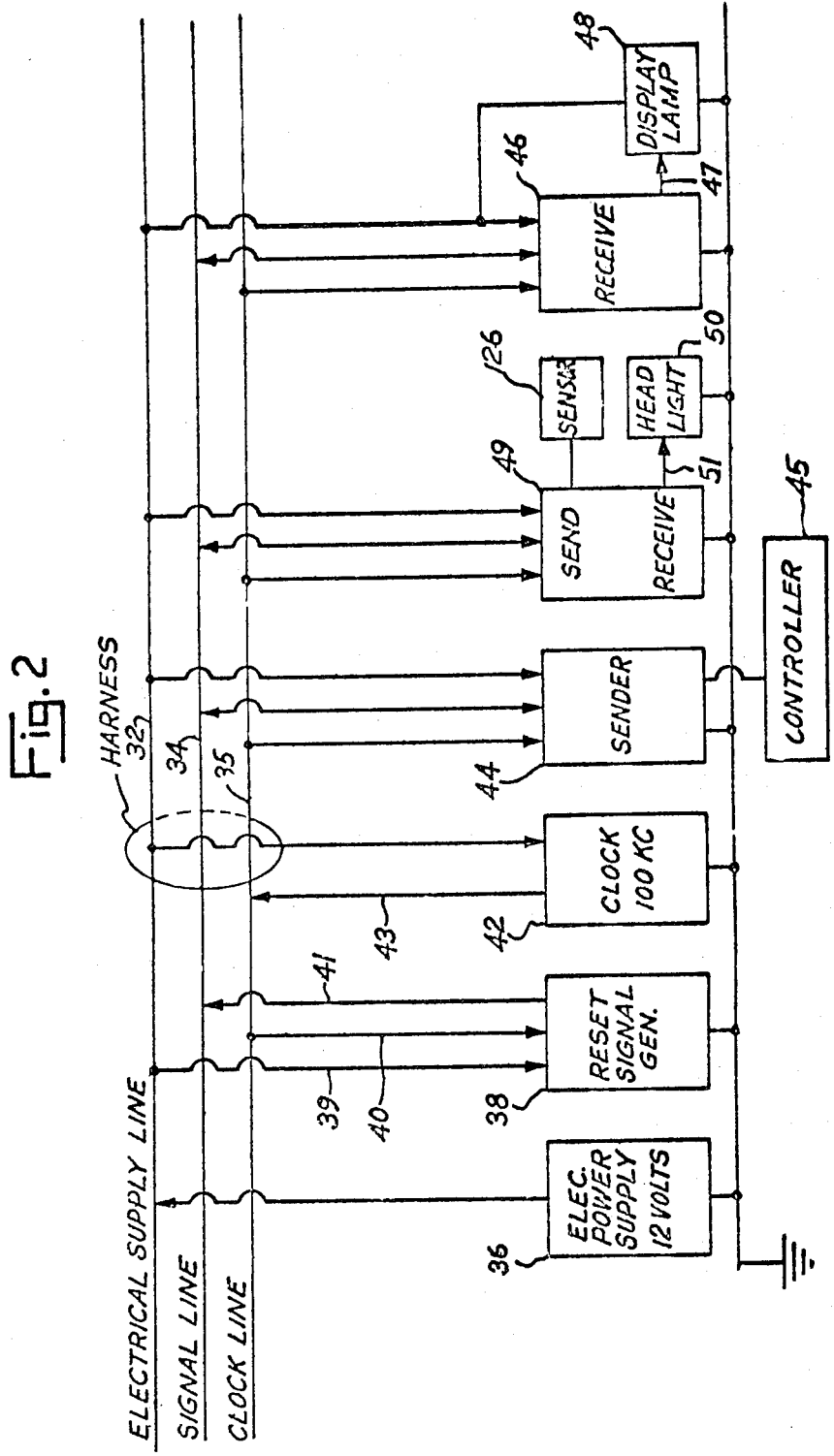
FIG. 2 is a schematic circuit diagram showing a preferred embodiment of a harness connected to various power, control and receive modules connected in accordance with the present invention.

FIG. 2 illustrates the manner in which an electrical power supply 36, a reset signal generator 38, a clock module 42, a sender module 44, a send-receive module 49, and a receive module 46 may be connected to harness 11. In this example, the harness 11 is formed of an electrical supply line or path 32, an electrical signal or information transmission line 34, and an electrical clock or timing line 35.

Source of electrical power 36 may comprise a 12-volt battery or the like that is connected between ground and electrical supply line 32. Thus, electrical power is carried to all other modules which may be connected to line 32 around the harness path.

Clock or timing module 42 is connected between electrical supply line 32 and ground, and its output is supplied to clock line 35 by means of a connector 43. The purpose of clock module 42 is to supply timing pulses to all of the modules connected to the harness 11 so that their operations will all be synchronized from a common clock source. Advantageously, in a preferred embodiment of the invention, clock module 42 comprises an oscillator or pulse generator of any suitable construction which is capable of providing output time-spaced pulses at a frequency of 100,000 cycles per second.

The reset-signal generator 38 supplies a coded signal through connector line 41 to signal line 34 to reset (and thus synchronize) all sender, send-receive, and receive modules.

The next module illustrated in FIG. 2 of the drawing, and described in greater detail below, is the sender module 44. The latter is connected to a suitable controller 45 which may take the form of a sensor, a computer, an operator, or any combination of the same. The purpose of the sender 44 is to transmit coded control signals throughout the harness 11, by means of the signal line 34, so that a selected module or modules will be activated to operate the associated load devices for the performance of a desired function. Sender module 44 receives its operating power from the electrical supply line 32 and is synchronized with the remaining circuits by its connection to the clock line 35 and signal line 34.

As stated above, any number of receive or send-receive modules may be connected to the harness 11 such that they may respond to their uniquely coded signals for the performance of an electrical function.

Another module shown in FIG. 2 is representative of the receive modules used for lamp outage indicator functions. Such receive module 46 is connected to the electric supply line 32 to receive electrical operating power, to the signal line 34 to receive the coded control and reset signals, and to clock line 35 to receive the timing signals.

The output of receive module 46 is connected over a conductor 47 to an electrical load device 48 including a switch. The latter is connected between the electrical supply line 32 in the harness 11 and ground. If, for example, the signals transmited over the signal line 34 of harness 11 contain the lamp outage code for which receive module 46 has been set, then receive module 46 supplies an output signal over conductor 47 to turn on the electrical load device 48. Thus, if the electrical load device 48 were a lamp outage indicator, for example, the lamp outage indicator would be actuated whenever the properly coded signals corresponding to the receive module 46 setting were transmitted down signal line 34.

Another module shown in FIG. 2 is the send-receive module 49. Such send-receive module is connected to electrical supply line 32 to receive electrical operating power, to the signal line 34 to receive the coded information and reset signals, as well as to send indicating signals, and to clock line 35 to receive the timing signals.

The load output of the send-receive module 49 is connected to an electrical load device 50, which in this case is a headlight, by means of connector 51.

The activation of headlight 50 is detected by a sensor 126. The indicating signal from the sensor is used in module 49 to determine if the headlight is operating properly. If the headlight is not operating properly, a coded signal is sent from module 49 on to line 34.

Thus, when the sender 44 sends information, the send-receive module 49 is activated and supplies an ON signal to headlight 50. Then, if the headlight is not operating properly, the send-receive module 49 sends information to the signal line 34 which is received by the receive module 46 and is used to activate display lamp 48.

FIG. 6 illustrates a schematic diagram of a reset signal generator 38 which supplies a coded signal through connection line 41 to signal line 34 to reset all sender, send-receive, and receive modules. The reset signal generator consists of a 4-bit binary counter, formed of trigger flip-flop stages 101, 102, 103, and 104, an AND gate 105 and a line amplifier 106. The free-running (i.e., not reset) binary counter with flip-flops 101, 102, 103 and 104 is triggered by the clock signal on line 35 through connector 40. AND gate 105 is connected to the *one* outputs of all flip-flops in the counter except the lowest order flip-flop 101. AND gate 105 is enabled for two consecutive clock states (or clock pulses), in this case, time counts 14 and 15. Amplifier 106 transmits a signal onto signal line 34 through connector 41 during these two consecutive clock states. This two-consecutive-clock-state signal is the coded reset signal to be received by all sender, send-receive, and receive modules. It should be noted that there must never be another similar signal for two consecutive clock states transmitted on the signal line 34 during a counter cycle (in this case 16 clock states). Another such signal would look like a reset code to all the sender, send-receive, and receive modules causing all to become reset without completing a whole counter cycle.

Figure 3:
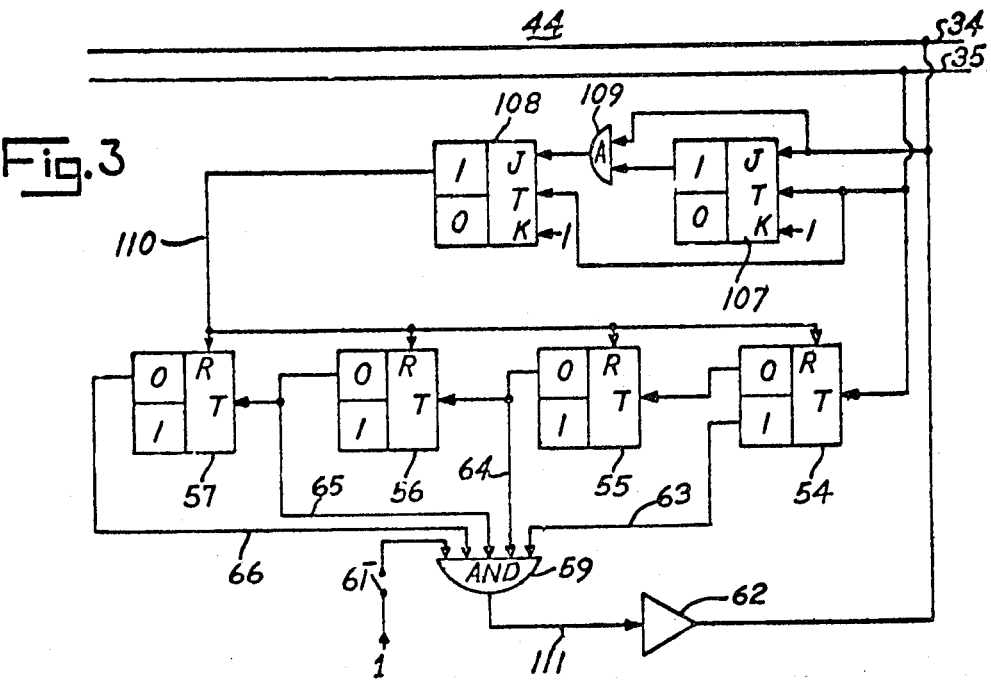
FIG. 3 is a schematic circuit diagram of a typical sender module.

FIG. 3 illustrates a schematic diagram of a typical sender module which can be attached to the harness 11 to provide coded control signals so that the desired send-receive modules can be selected and operated. As shown in FIG. 3, the sender module comprises a binary counter formed of the flip-flop stages 54, 55, 56 and 57, plus a reset circuit comprising flip-flops 107 and 108, plus AND gates 59 and 109 and an amplifier 62. Those skilled in the art are thoroughly familiar with the various forms which such binary counters, AND gates and amplifiers can take in actual practice and, therefore, this type of apparatus is shown in block form only throughout the drawings. Each flip-flop stage of the binary counter is capable of being switched to either one of two states, such states representing the digits 0 and 1, respectively. Although the binary counter illustrated in FIG. 3 comprises four stages capable of achieving a count up to 16, it will be understood that a larger or smaller number of flip-flop stages may be utilized, as desired.

Two J-K flip-flops 107 and 108 and AND gate 109 comprise the reset circuit which responds to the reset code generated in the reset-signal generator and transmitted on the signal line 34. The reset code from signal line 34 comprised of a signal for two consecutive clock states enters the J input of flip-flop 107 causing flip-flop 107 to be set to a 1 upon arrival of the next clock pulse on clock line 35. The K inputs of flip-flops 107, 108 are continually provided with an input signal that represents a one state. The output of flip-flop 107 and the signal from signal line 34 are fed into AND gate 109. The output of AND gate 109 is connected to the J input of flip-flop 108. Flip-flop 108 is set upon the arrival of the next clock pulse if flip-flop 107 is set to a 1 and there is a signal on line 34 (the case during the second consecutive signal on the line 34). The output from flip-flop 108 is connected through line 110 to all reset (R) inputs of counter flip-flops 54, 55, 56 and 57. These counter flip-flops are reset to zero whenever flip-flop 108 is set to 1.

It will be noted that the J-K flip-flops 107 and 108 are provided with a K input as well as the J input and the clock T input. As shown in FIG. 3, the K input is permanently connected to a 1 signal source. Thus, whenever a 1 is applied to a J input, the flip-flop changes to a 1 state when a clock pulse is applied to the T input and changes back to 0 state at the next following clock pulse on the T input, even if the 1 remains at the J input during the second clock pulse. It can be seen that the J-K flip-flops are always reset by changing to a 0 state on the clock pulse following the clock pulse that set the flip-flop to the 1 state. The operation of such J-K flip-flops is well-known, as described in the publication entitled USING MRTL I/C FLIP-FLOPS by Motorola Semiconductor Products Inc. dated September, 1966.

After being reset, the counter flip-flop stages begin counting clock pulses received from line 35. The selective outputs of the flip-flop counter stages are connected to AND gate 59 along with a line from switch 61. If switch 61 is closed (note that switch 61 can take the form of some electrical output from a computer or controller) and there is a coincidence of inputs to the AND gate 59 from the counter, a control signal pulse will be conducted from the AND gate on line 111 to amplifier 62. Amplifier 62 transmits the AND gate control signal pulse to the signal line 34. In FIG. 3, the control signal pulse from the AND gate 59 would occur during counter count 1 (i.e., at time T1). Other sender modules may send outputs at different counter states. Furthermore, there may be several sender modules at the same counter state (in case control from more than one location is desired).

In a manner to be described in greater detail below, modules which have been coded to respond to the T1 signal are activated to actuate their primary load devices and thereby provide the desired circuit function. For example, if the automobile headlights are controlled by a send-receive module coded to respond to a T1 signal, then the closing of the switch 61 in the sender circuit — either by the automobile driver, the computer, or by a sensor element such as a photocell — will cause the send-receive element to send a signal which will actuate the headlights.

Figure 4:
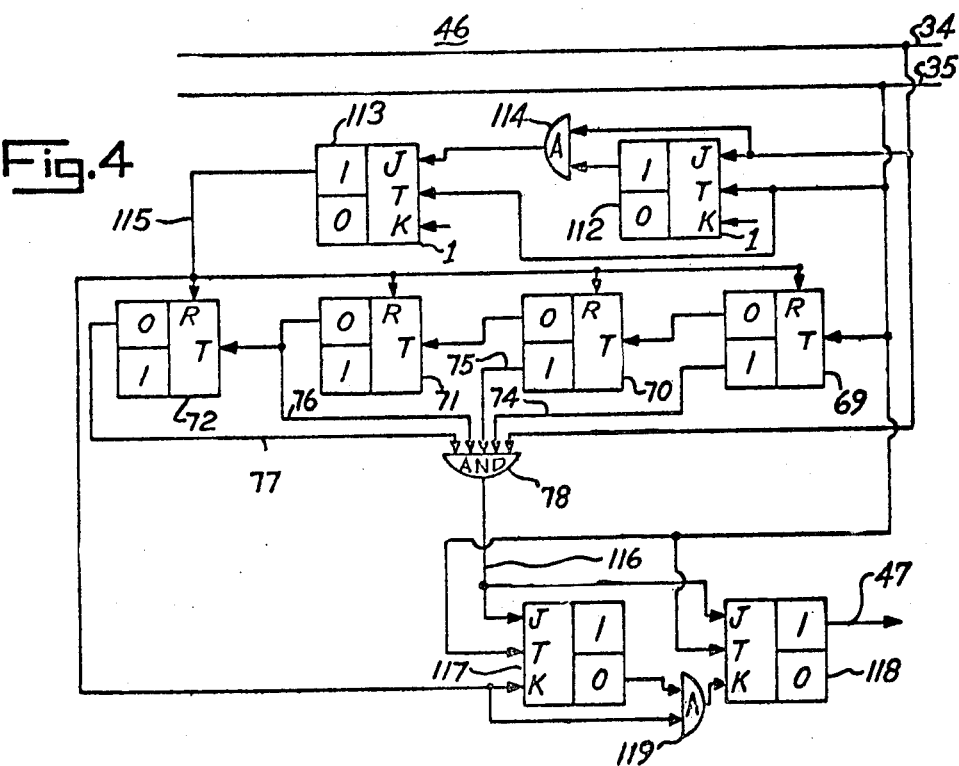
FIG. 4 is a schematic circuit diagram of a typical receive module.

FIG. 4 illustrates a typical receive module which is adapted to be connected to the harness 11 to receive the coded control signals required for lamp outage information. As shown in FIG. 4, the receive circuit comprises a reset circuit, a binary counter formed of a plurality of flip-flop stages, and gates arranged in a manner similar to the typical sender module as shown in FIG. 3 of the drawings.

In addition, an ON-OFF circuit composed of two J-K flip-flops and an AND gate is provided to store the fact that the module has received its coded control signal.

The reset circuit comprised of flip-flops 112, 113, and AND gate 114, functions in an identical manner to the reset circuit in FIG. 3 to reset the flip-flops 69, 70, 71 and 72.

For purposes of illustration, the binary counter flip-flops comprise a 4-bit counter with the output leads 74 and 75 being connected to the 1 state outputs of flip-flops 69 and 70, respectively, and the output leads 76 and 77 being connected to the 0 state outputs of flip-flops 71 and 72, respectively. Thus, the typical receive module of FIG. 4 is shown, for purposes of illustration, as a receiver which counts clock pulses and detects the presence of a control signal pulse on signal line 34 at time T3, since there will be an output on all of the output leads 74, 75, 76 and 77 only at the time T3 in the cycle. Each of these output leads is connected to AND gate 78, and at the time T3 only, the AND gate is permitted to transmit a signal from signal line 34. It is now clear that when a T3 pulse is transmitted on the signal line 34, and only at this time, the AND gate 78 will provide an output on line 116 to the J inputs of J-K flip-flops 117 and 118. Flip-flops 117 and 118 will be set to a 1 state by the occurrence of a clock pulse (in this case, the T4 clock pulse) if there is a signal on line 116 during time T3. An ON signal (i.e., an output signal) will then appear on line 47 on the output of flip-flop 118 to be used to actuate an associated load device.

Flip-flop 118 will not be reset to its 0 state unless there is an input to its K input from the output of AND gate 119. AND gate 119 receives its inputs from line 115, the reset signal line from flip-flop 113, and from the 0 output of flip-flop 117. Flip-flop 117 receives a signal from reset line 115 on its K input and is thus reset to its 0 state, if it were in a 1 state, by the clock pulse that follows the reset signal. The AND gate 119 would not be enabled during these times since the flip-flop 117 is not set to its 0 state until after the reset signal has occurred. (Note that flip-flop 113 and flip-flop 117 change from their 1 to 0 states on the same clock pulse. Even though there is a possibility of AND gate 119 being enabled for an instant because of differences in switching times in the flip-flops 113 and 117, flip-flop 118 cannot possibly switch since its clock pulse has already entered its trigger input). If, however, there is no signal during T3 on line 116 and flip-flop 117 does not become set to a 1 state (i.e., it stays in a 0 state), AND gate 119 will be enabled when there is a reset signal on line 115. Flip-flop 118 will then be reset to its 0 state on the next clock pulse. Resetting flip-flop 118 will then turn the output signal on line 47 off. Therefore, the associated load device will be turned off at this time, the load device being a display lamp 48.

FIG. 5 illustrates a typical send-receive module 49 wherein the components identified by the subscript *a* correspond to the like-numbered components shown in FIG. 4. Those skilled in the art will appreciate that the "receive" function of module 49 is performed in the same manner described in connection with the analogous FIG. 4 components. Of course, since AND circuit 78a is connected to the zero outputs of flip-flops 70a–72a and the one output of flip-flop 69a, an output can only be produced on conductor 116a during time T1. This is the same period of time during which sender module 44 is enabled and is producing a control signal pulse. That is, flip-flops 69a–72a and gate 78a detect the presence of a control signal pulse received on line 34 during time T1, and switch flip-flops 117a and 118a to their one states. The zero output of flip-flop 118a then produces an output signal that switches transistor 124 to its conducting state. As a result, current flows through headlight 150 and the collector-emitter junction of transistor 124 to a supply of negative voltage 125. Thus, AND gate 78a, flip-flops 117a, 118a, and transistor 124 provide means for activating headlight 150 in response to the control signal pulse produced by sender module 44 during the "1" counting state of flip-flops 69a–72a. When sender module 44 stops producing a control signal pulse during time T1, flip-flop 118a is reset to its zero state during the next counting cycle in the manner previously described. Transistor 124 is then switched to its nonconductive state so that headlight 150 is turned off.

According to one important feature of the invention, the "send" function of module 49 is achieved by merely adding AND gate 120 and amplifier 122 to the above-described components. According to this aspect of the invention, J-K flip-flops 112a, 113a, and AND gate 114a comprise the reset circuit for the send mode of operation. Likewise, flip-flops 69a–72a comprise a four stage binary counter that counts clock pulses received from line 35 after the counter is reset. The one state outputs of flip-flops 69a, 70a, and the zero state outputs of flip-flops 71a, 72a are connected to the inputs of AND gate 120. As a result, the send function of module 49 is operative during the T3 counting state of the clock cycle. The output of AND gate 120 is connected through amplifier 122 to signal line 34. It should be noted that the send function of module 49 is also controlled by a sensor photoelectric cell 126 that is connected through a resistor 127 to the source of negative potential 125.

The send function of module 49 is achieved as follows. Cell 126 is placed adjacent headlight 150 so that part of the illumination created by the headlight may be absorbed by the cell. Accordingly, when the headlight is not producing an appropriate amount of illunination, a relatively low amount of light energy is absorbed by cell 126. In this mode of operation, the cell has a resistance such that an indicating voltage signal is provided to AND gate 120 over a conductor 121. A similar signal is provided over a conductor 130 as long as flip-flop 118a remains in its 1 state. As a result, during time T3, AND gate 120 is enabled by flip-flops 69a–72a, and it conducts a signal to amplifier 122. Amplifier 122, in turn, causes a control signal pulse to be conducted to signal line 34 at a time T3. Thus, AND gate 120 and amplifier 122 provide means for producing a control signal pulse during the "3" counting state of flip-flops 69a–72a. As previously explained, receive module 46 is conditioned by the clock pulses to receive a control signal pulse during time T3. As a result, display lamp 48 is lighted in the manner previously described in order to indicate that headlight 150 is not operating properly.

Likewise, if headlight 150 produces illumination of an appropriate predetermined value, cell 126 has a resistance such that an insufficient voltage signal is provided to AND gate 120. In this mode of operation, no control signal pulse is produced on signal line 34 at time T3. As a result, receive module 46 is not activated, and display lamp 48 is not illuminated, thereby indicating that headlight 150 is operating properly.

Those skilled in the art will readily understand that the preferred apparatus and methods described herein may be modified and altered without departing from the true spirit and scope of the invention. In particular, many of the electrical components shown in separate modules herein may be assembled in a more central location on the vehicle.

What we claim is:

1. In an electrical control system comprising a source of electrical power, a harness for selectively conducting electrical power to one or more load devices, said harness comprising a signal transmission path and an electrical power path connected to said source, and sender means for selectively applying a first control signal to said signal transmission path, improved means for activating at least a desired one of said load devices and for indicating the condition of said desired load device comprising in combination:

a sensor for generating a predetermined indicating signal if said desired load device is in a predetermined condition;

send-receive means connected to said electrical power and signal transmission paths for receiving said first control signal to selectively activate said desired load device and for applying a second control signal to said signal transmission path in response to said indicating signal from said sensor, said send-receive means comprising a binary counter, means for resetting said binary counter, means for generating said second control signal when said indicating signal is produced during a predetermined counting state of said binary counter, and means for activating said desired load device in response to said first control signal during another predetermined counting state of said binary counter; and receive means connected to said electrical power and signal transmission paths for receiving said second control signal to activate a controlled device in response to said second control signal.

2. An electrical control system, as claimed in claim 1, wherein said sensor comprises a photo-electric cell.

3. Apparatus for controlling and indicating the operating state of a vehicular device comprising:

means for generating a series of time-spaced clock pulses that define counting states which occur in cycles;

means for generating a first series of control pulses, each of said pulses occurring during a predetermined one of said counting states in each cycle;

means for transmitting said first series of control pulses over a transmission path;

means for detecting the presence of said first series of control pulses;

means for generating a first output signal in response to said detected first series of control pulses, said means for generating a first output signal comprising a counter;

means for operating said vehicular device in response to said first output signal;

means for generating an indicating signal in response to the operating characteristics of said operated vehicular device;

means comprising said counter for generating a second series of control pulses in response to said indicating signal, each of said second series of control pulses occurring during a counting state in which no pulse in the first series is present;

means for transmitting said second series of control pulses over said transmission path;

means for detecting the presence of said second series of control pulses;

means for generating a second output signal in response to said detected second series of control pulses; and means for indicating the operating condition of said operated vehicular device at a remote location in response to said second output signal.

* * * * *